(12) United States Patent
Pao et al.

(10) Patent No.: US 11,172,543 B2
(45) Date of Patent: Nov. 9, 2021

(54) DEVICE AND METHOD OF HANDLING PHYSICAL DOWNLINK SHARED CHANNELS IN BANDWIDTH PARTS

(71) Applicant: ACER INCORPORATED, New Taipei (TW)

(72) Inventors: Wei-Chen Pao, New Taipei (TW); Chien-Min Lee, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/436,871

(22) Filed: Jun. 10, 2019

(65) Prior Publication Data

US 2019/0387579 A1 Dec. 19, 2019

Related U.S. Application Data

(60) Provisional application No. 62/685,293, filed on Jun. 15, 2018.

(51) Int. Cl.
| | | |
|---|---|---|
| *H04W 72/04* | (2009.01) |
| *H04W 88/06* | (2009.01) |
| *H04W 76/11* | (2018.01) |
| *H04L 1/18* | (2006.01) |
| *H04L 5/00* | (2006.01) |
| *H04W 8/24* | (2009.01) |

(52) U.S. Cl.
CPC .......... *H04W 88/06* (2013.01); *H04L 1/1819* (2013.01); *H04L 5/0051* (2013.01); *H04L 5/0055* (2013.01); *H04L 5/0082* (2013.01); *H04W 8/24* (2013.01); *H04W 72/042* (2013.01); *H04W 76/11* (2018.02)

(58) Field of Classification Search
None
See application file for complete search history.

(56) References Cited

U.S. PATENT DOCUMENTS

| | | | |
|---|---|---|---|
| 2015/0304997 A1* | 10/2015 | Park | H04L 23/00 370/330 |
| 2018/0167946 A1 | 6/2018 | Si et al. | |
| 2018/0270698 A1* | 9/2018 | Babaei | H04W 72/042 |
| 2018/0343154 A1* | 11/2018 | Park | H04L 5/005 |

(Continued)

FOREIGN PATENT DOCUMENTS

| | | |
|---|---|---|
| CN | 108012329 | 5/2018 |
| CN | 108024365 | 5/2018 |

OTHER PUBLICATIONS

Mediatek Inc., Remaining Issues on Beam Management, 3GPP TSG RAN WG1 Meeting #93, Busan Korea, May 21-25, 2018, R1-1806788, XP051441990.

(Continued)

*Primary Examiner* — Sithu Ko
*Assistant Examiner* — Emmanuel K Maglo
(74) *Attorney, Agent, or Firm* — JCIPRNET

(57) ABSTRACT

A communication device for handling a plurality of PDSCHs in a plurality of BWPs comprises at least one storage device and at least one processing circuit coupled to the at least one storage device. The at least one storage device stores, and the at least one processing circuit is configured to execute instructions of: determining a quasi-colocation (QCL) assumption according to an indication; and receiving at least one PDSCH of a plurality of PDSCHs in a plurality of BWPs in a time interval according to the QCL assumption from a network.

15 Claims, 10 Drawing Sheets

(56) References Cited

U.S. PATENT DOCUMENTS

| | | | |
|---|---|---|---|
| 2019/0174466 A1* | 6/2019 | Zhang | H04L 5/005 |
| 2019/0239093 A1* | 8/2019 | Zhang | H04L 5/001 |
| 2019/0273637 A1* | 9/2019 | Zhang | H04B 5/0031 |
| 2019/0313386 A1* | 10/2019 | Hwang | H04L 5/0044 |
| 2019/0313429 A1* | 10/2019 | Cheng | H04W 72/1257 |
| 2019/0313437 A1* | 10/2019 | Jung | H04L 5/0053 |
| 2019/0313440 A1 | 10/2019 | Wilson | |
| 2019/0349149 A1 | 11/2019 | Nam | |
| 2019/0363840 A1 | 11/2019 | Wang | |
| 2019/0363843 A1 | 11/2019 | Gordaychik | |
| 2020/0077432 A1* | 3/2020 | Xiong | H04L 1/1825 |

OTHER PUBLICATIONS

Qualcomm Incorporated, Remaining Details on QCL, 3GPP TSG-RAN WG1 Meeting #93, Busan, Korea, May 21-25, 2018, pp. 1-10, R1-1807398, Revision of R1-1807351, XP051442590.

Ericsson, Feature lead summary 2 for beam measurement and reporting, 3GPP TSG-RAN WG1 Meeting #93, Busan, May 21-25, 2018, pp. $\frac{1}{35}$-$\frac{35}{35}$, R1-1807679, XP051463308.

3rd Generation Partnership Project; Technical Specification Group Radio Access Network; NR; Physical layer procedures for control (Release 15), Technical Specification, Dec. 2017, pp. 1-56, 3GPP TS 38.213, V2.0.0, 3GPP Organizational Partners(ARIB, ATIS, CCSA, ETSI, TSDSI, TTA, TTC), XP051364819, Dec. 2017.

Nokia, Nokia Shanghai Bell, Remaining details on multi-TRP transmission, 3GPP TSG RAN WG1 NR Ad Hoc #3, Nagoya, Japan, Sep. 18-21, 2017, R1-1716494, XP051339947.

LG Electronics, Discussion on cooperative transmission, 3GPP TSG RAN WG1 Meeting #90, Prague, Czech Republic, Aug. 21-25, 2017, pp. 1-4, R1-1713139, XP051315948.

Huawei, Hisilicon, Remaining issues on scheduling and HARQ, 3GPP TSG RAN WG1 Meeting #93, R1-1805888, May 21-25, 2018, Busan, Korea, XP051441107.

Qualcomm Incorporated, Summary of DL/UL scheduling and HARQ management, 3GPP TSG-RAN WG1 Meeting AH 1801, R1-1803470, Feb. 26-Mar. 2, 2018, pp. 1-23, Athens, Greece, XP051398767.

Qualcomm Incorporated, Remaining Issues on DL/UL scheduling, Processing Time and HARQ management, 3GPP TSG-RAN WG1 Meeting #92, 1802842, Feb. 26-Mar. 2, 2018, pp. 1-11, Athens, Greece, XP051398255.

Samsung, Corrections on HARQ management and Feedback, 3GPP TSG RAN WG1 Meeting #93, R1-1806738, May 21-25, 2018, pp. 1-4, Busan, Korea, XP051441940.

Vivo, "Remaining issues on QCL," 3GPP TSG RAN WG1 #92, Feb. 2018, pp. 1-4.

Catt, "Remaining details on beam management," 3GPP TSG RAN WG1 Meeting 91, Nov. 2017, pp. 1-11.

Intel Corporation, "On requirement for BWP switching," 3GPP TSG-RAN4 Meeting #86bis, Apr. 2018, pp. 1-4.

\* cited by examiner

| List | Priority ordering (high to low) |
|------|-------------------------------|
| 00   | BWP1, BWP2, BWP3, BWP4        |
| 01   | BWP4, BWP3, BWP2, BWP1        |
| 10   | BWP3, BWP1, BWP4, BWP2        |
| 11   | BWP1, BWP4, BWP3, BWP2        |

| Value of indicator field | Capability of communication device | Comment |
|---|---|---|
| 0 | Support with limited capability | No support parallel processing of PDSCH(s) in multiple BWPs |
| 1 | Support | Support parallel processing of PDSCH(s) in multiple BWPs |
| 2 | No support | No support multiple BWPs |

FIG. 9

| Type | SCS combination set |
|---|---|
| 1 | 15 KHz, 30 KHz |
| 2 | 15 KHz, 60 KHz |
| 3 | 30 KHz, 60 KHz |
| 4 | 15 KHz, 30 KHz, 60 KHz |
| 5 | Single numerology |

DEVICE AND METHOD OF HANDLING PHYSICAL DOWNLINK SHARED CHANNELS IN BANDWIDTH PARTS

CROSS REFERENCE TO RELATED APPLICATIONS

This application claims the benefit of U.S. Provisional Application No. 62/685,293, filed on Jun. 15, 2018, which is incorporated herein by reference.

BACKGROUND OF THE INVENTION

1. Field of the Invention

The present invention relates to a device and a method used in a wireless communication system, and more particularly, to a device and a method of handling physical downlink shared channels in bandwidth parts.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc. For a UE and an eNB to communicate with each other in the LTE-A system, the UE and the eNB must support standards developed for the LTE-A system, such as the 3GPP Rel-1X standard or later versions.

In a high-frequency scenario, the eNB or a gNB may indicate that physical DL shared channels (PDSCHs) in bandwidth parts (BWPs) are transmitted via different transmission configuration indication (TCI) states (e.g., different beams) by transmitting downlink (DL) control informations (DCIs) to the UE. However, even if the UE receives the indication from the eNB, the UE may not be able to receive the PDSCHs via the TCI states at the same time due to an ability of the UE. Thus, how to handle the PDSCHs in the BWPs is an important problem to be solved.

SUMMARY OF THE INVENTION

The present invention therefore provides a communication device and method for handling physical downlink shared channels (PDSCHs) in bandwidth parts (BWPs) to solve the abovementioned problem.

A communication device for handling a plurality of PDSCHs in a plurality of BWPs comprises at least one storage device and at least one processing circuit coupled to the at least one storage device. The at least one storage device stores instructions, and the at least one processing circuit is configured to execute the instructions of: determining a quasi-colocation (QCL) assumption according to an indication; and receiving at least one PDSCH of a plurality of PDSCHs in a plurality of BWPs in a time interval according to the QCL assumption from a network.

A communication device for handling a user equipment (UE) capability of communications in a plurality of BWPs comprises at least one storage device and at least one processing circuit coupled to the at least one storage device. The at least one storage device stores instructions, and the at least one processing circuit is configured to execute the instructions of: transmitting the UE capability comprising an information of the plurality of BWPs to a network.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 9 is a table of a UE capability according to an example of the present invention.

FIG. 10 is a table of a UE capability according to an example of the present invention.

DETAILED DESCRIPTION

Figure 1:
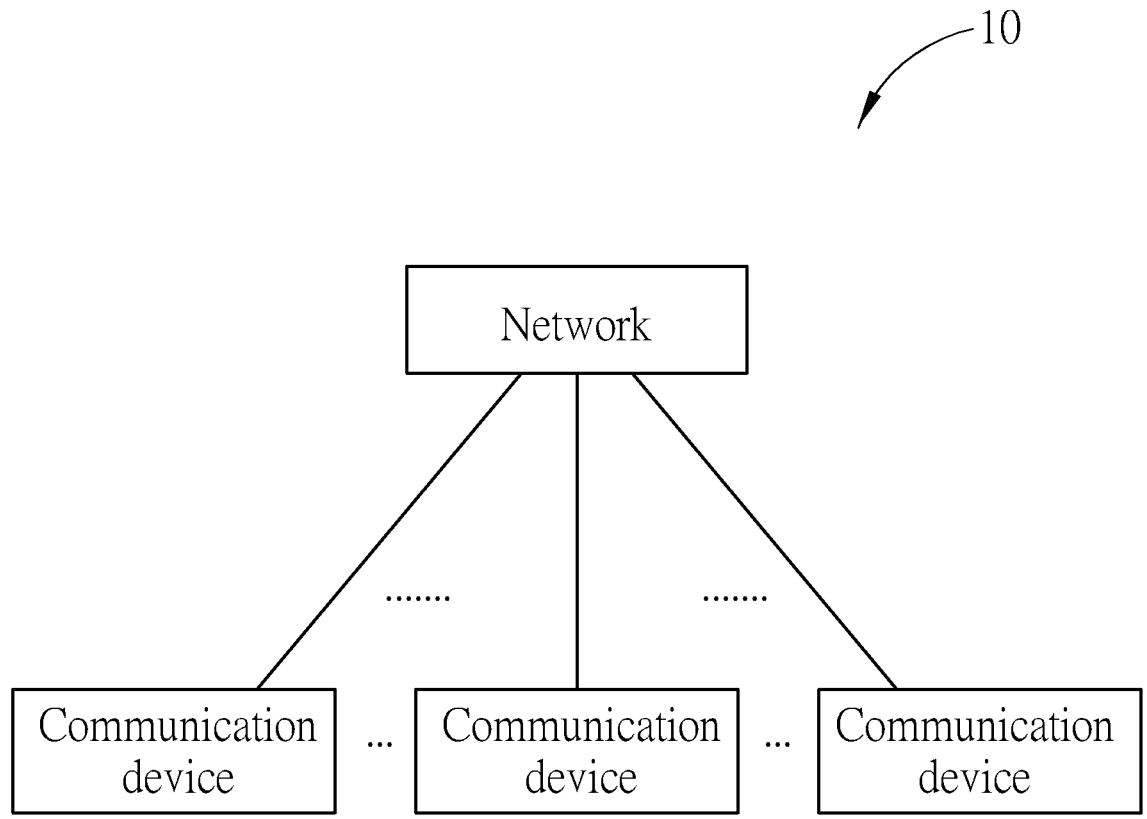
FIG. 1 is a schematic diagram of a wireless communication system according to an example of the present invention.

FIG. 1 is a schematic diagram of a wireless communication system according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode or a licensed-assisted access (LAA) mode. That is, the network and a communication device may communicate with each other via FDD carrier(s), TDD carrier(s), licensed carrier(s) (licensed serving cell(s)) and/or unlicensed carrier(s) (unlicensed serving cell(s)). In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In one example, the network may be an evolved UTRAN (E-UTRAN) including at least one evolved NB (eNB) and/or at least one relay node in a long term evolution (LTE) system, a LTE-Advanced (LTE-A) system, an evolution of the LTE-A system, etc. In one example, the network may be a next generation radio access network (NR-RAN) including at least one eNB, at least one next generation NB (gNB) and/or at least one fifth generation (5G) base station (BS).

A new radio (NR) is a standard defined for a 5G system (or 5G network) to provide a unified air interface with better performance. gNBs are deployed to realize the 5G system, which supports advanced features such as enhanced Mobile Broadband (eMBB), Ultra Reliable Low Latency Communications (URLLC), massive Machine Type Communications (mMTC), etc. The eMBB provides broadband services with a greater bandwidth and a low/moderate latency. The URLLC provides applications (e.g., end-to-end communication) with properties of a higher reliability and a low latency. The examples of the applications include an industrial internet, smart grids, infrastructure protection, remote surgery/driving and an intelligent transportation system (ITS). The mMTC is able to support internet-of-things (IoT) of the 5G system which mat billions of connected devices and/or sensors.

Furthermore, the network may also include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In one example, after the network receives information transmitted by a communication device, the information may be processed only by the UTRAN/E-UTRAN/NG-RAN and decisions corresponding to the information are made at the UTRAN/E-UTRAN/NG-RAN. In one example, the UTRAN/E-UTRAN/NG-RAN may forward the information to the core network, and the decisions corresponding to the information are made at the core network after the core network processes the information. In one example, the information may be processed by both the UTRAN/E-UTRAN/NG-RAN and the core network, and the decisions are made after coordination and/or cooperation are performed by the UTRAN/E-UTRAN/NG-RAN and the core network.

A communication device may be a user equipment (UE), a low cost device (e.g., machine type communication (MTC) device), a device-to-device (D2D) communication device, a narrow-band internet of things (IoT) (NB-IoT) device, a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
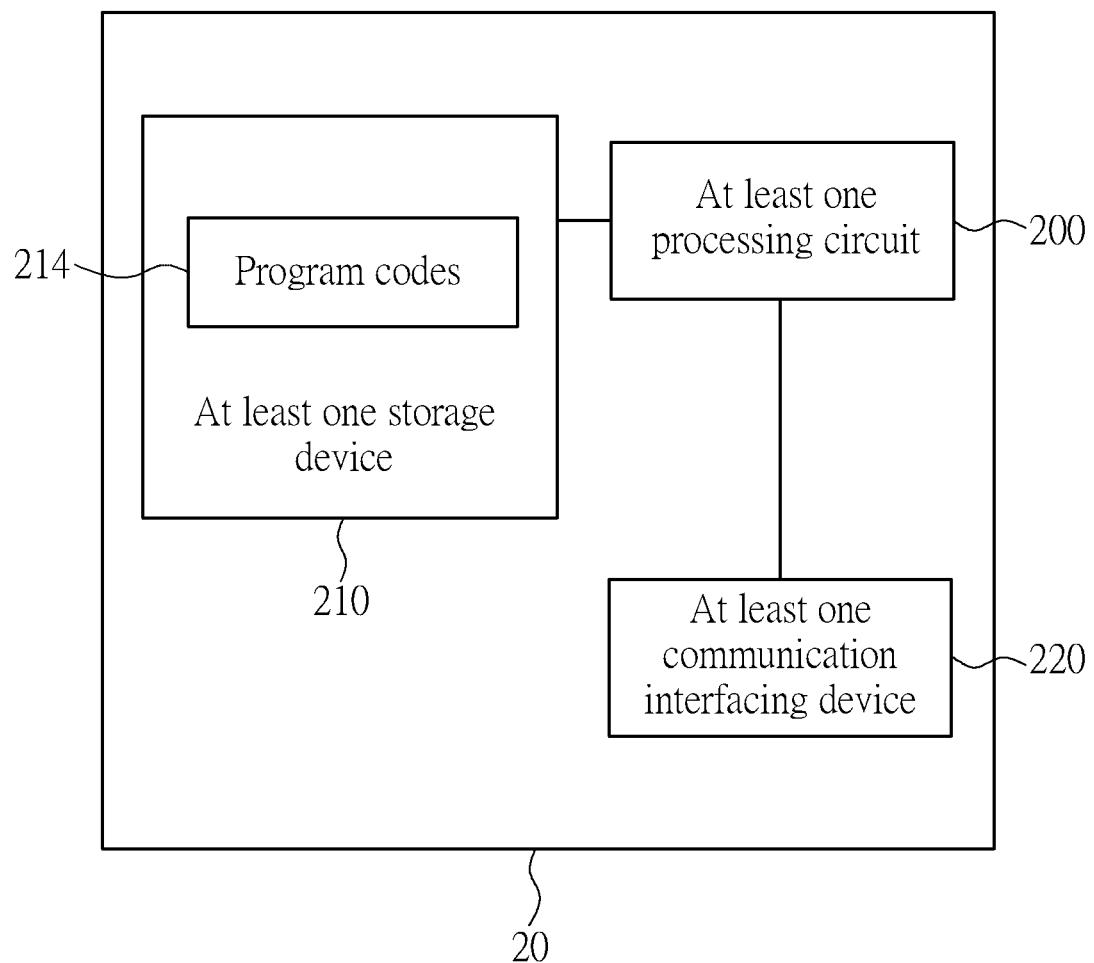
FIG. 2 is a schematic diagram of a communication device according to an example of the present invention.

FIG. 2 is a schematic diagram of a communication device 20 according to an example of the present invention. The communication device 20 may be used for realizing a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

Figure 3:
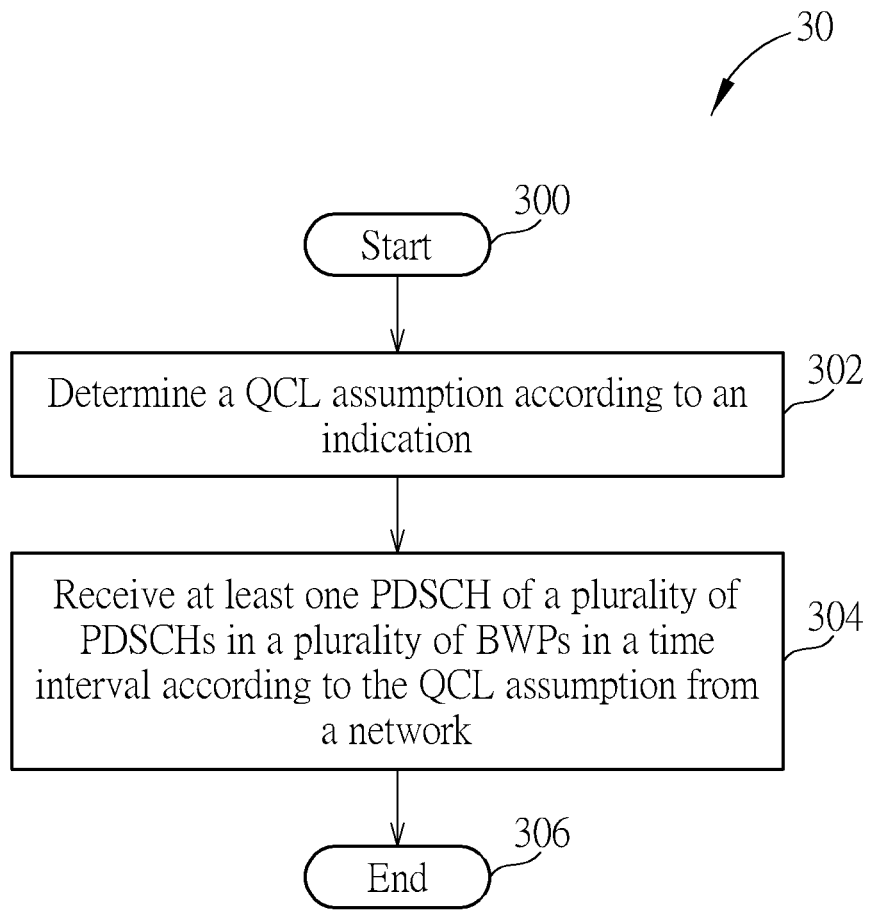
FIG. 3 is a flowchart of a process according to an example of the present invention.

FIG. 3 is a flowchart of a process 30 according to an example of the present invention. A process 30 is utilized in a communication device, to handle a plurality of physical DL shared channels (PDSCHs) in a plurality of bandwidth parts (BWPs), and includes the following steps:

Step 300: Start.

Step 302: Determine a quasi-colocation (QCL) assumption according to an indication.

Step 304: Receive at least one PDSCH of a plurality of PDSCHs in a plurality of BWPs in a time interval according to the QCL assumption from a network.

Step 306: End.

According to the process 30, the communication device determines (e.g., generates, computes or selects) a QCL assumption according to an indication (e.g., a beam or a spatial domain filter). Then, the communication device receives at least one PDSCH of a plurality of PDSCHs in a plurality of BWPs in a time interval (e.g., a time slot) according to the QCL assumption from a network. That is, the communication device determines the QCL assumption according to the indication, to handle the plurality of PDSCHs. The QCL assumption indicates that the at least one PDSCH and at least one signal (e.g., channel state information-reference signal (CSI-RS)) are transmitted according to a channel characteristic. For example, the at least one PDSCH and at least one signal are transmitted via the same beam or the same spatial domain filter. Thus, according to the QCL assumption, the communication device may use the same channel characteristic (e.g., the same beam) to receive the at least one PDSCH and the at least one signal. In one example, the indication is a transmission configuration indication (TCI) state.

Realization of the process 30 is not limited to the above description. The following examples may be applied for realizing the process 30.

In one example, at least two of the plurality of PDSCHs are associated with a plurality of indications (e.g., a plurality of TCI states). That is, the at least two of the plurality of PDSCHs may be associated with different indications (e.g., different TCI states). Different TCI states indicate that the at least one PDSCH is received according to different QCL assumptions (e.g., by using different beams or different spatial domain filters). In one example, the communication device receives the plurality of PDSCHs in the time interval according to the QCL assumption from the network. That is, all of the plurality of PDSCHs may be received in the time interval by using the QCL assumption. In one example, the communication device receives the at least one PDSCH of the plurality of PDSCHs indicated by the TCI state in the time interval from the network.

In one example, the indication (e.g., the TCI state) is determined according to a DL control information (DCI) which schedules one of the plurality of PDSCHs. In one example, the DCI is a first DCI which schedules one of the plurality of PDSCHs. For example, the communication device determines a TCI state "0" (e.g., the TCI state with a value "0" or TCI=0) according to the first DCI, and determines the QCL assumption according to the TCI state "0". The communication device may receive the plurality of PDSCHs according to the QCL assumption. Or, the communication device may receive the at least one PDSCH of the plurality of PDSCHs indicated by the TCI state "0", and may not decode remaining PDSCH(s) of the plurality of PDSCHs.

In one example, the DCI is a latest DCI which schedules one of the plurality of PDSCHs. For example, the communication device determines a TCI state "1" (e.g., the TCI state with a value "1" or TCI=1) according to the latest DCI, and determines the QCL assumption according to the TCI state "1". The communication device may receive the plurality of PDSCHs according to the QCL assumption. Or, the communication device may receive the at least one PDSCH of the plurality of PDSCHs indicated by the TCI state "1", and may not decode remaining PDSCH(s) of the plurality of PDSCHs.

Figure 4:
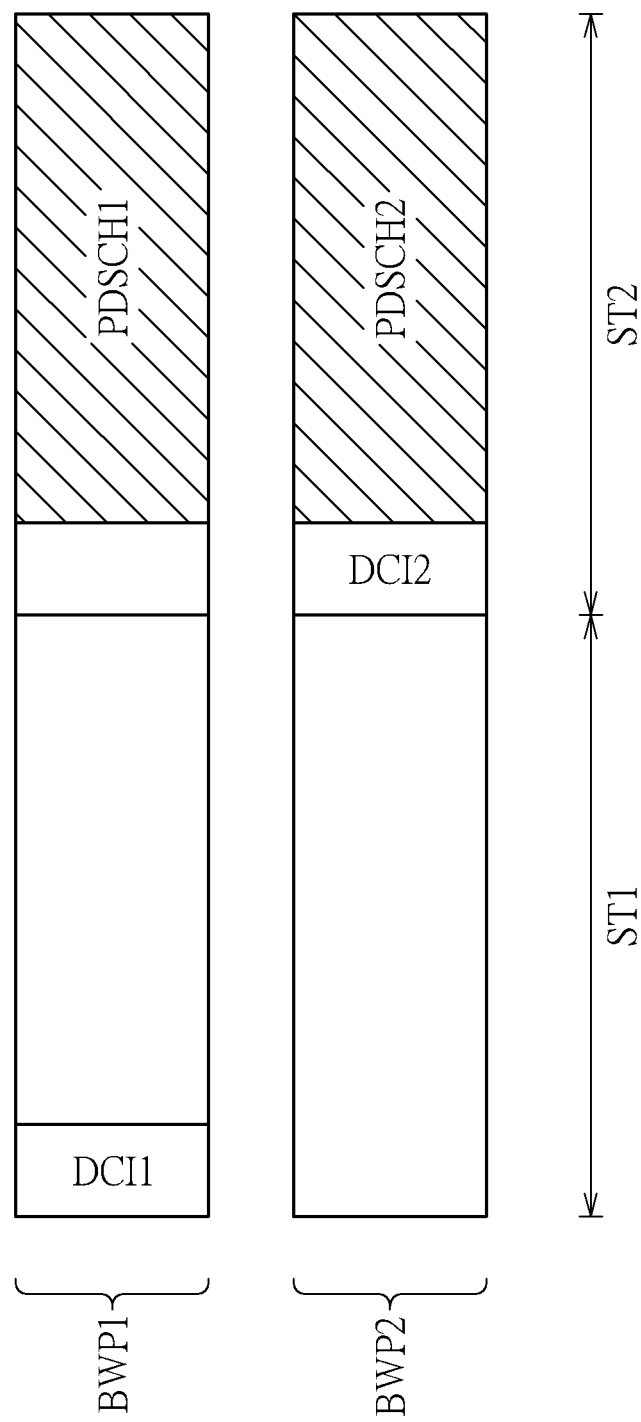
FIG. 4 is a schematic diagram of a reception of a plurality of PDSCHs according to an example of the present invention.

FIG. 4 is a schematic diagram of a reception of a plurality of PDSCHs according to an example of the present invention. The communication device may be scheduled to receive a PDSCH PDSCH1 and/or a PDSCH PDSCH2 in a slot ST2 from the network. Communications between the network and the communication device are performed via BWPs BWP1 and BWP2. A DCI DCI1 is transmitted in a slot ST1 via the BWP BWP1, and a DCI DCI2 is transmitted in the slot ST2 via the BWP BWP2. The PDSCH PDSCH1 is indicated by a TCI state "0", and the PDSCH 2 is indicated by a TCI state "1". In the case of a TCI state determined according to the DCI DCI1 (i.e., the first DCI), a value of the TCI state is "0". The communication device receives the PDSCHs PDSCH1 and PDSCH2 in the slot ST2 via the BWPs BWP1 and BWP2, respectively, by using a QCL assumption determined according to the TCI state "0". Or, the communication device receives the PDSCH PDSCH1 in the slot ST2, and does not decode the PDSCH PDSCH2. In the case of a TCI state determined according to the DCI DCI2 (i.e., the latest DCI), a value of the TCI state is "1". The communication device receives the PDSCHs PDSCH1 and PDSCH2 in the slot ST2 via the BWPs BWP1 and BWP2, respectively, by using a QCL assumption determined according to the TCI state "1". Or, the communication device receives the PDSCH PDSCH2 in the slot ST2, and does not decode the PDSCH PDSCH1.

In one example, the communication device receives the at least one PDSCH from at least one serving cell of the network. In one example, the indication is determined according to a cell identity (ID) of one of the at least one serving cell. The cell ID may be a highest cell ID or a lowest cell ID. The at least one serving cell is used for transmitting the at least one PDSCH of the plurality of PDSCHs.

In one example, the at least one serving cell is determined according to a cell list. In one example, the cell list includes at least one cell ID indicating the at least one serving cell. One of the at least one serving cell may be associated with a central frequency. In one example, the communication device is configured with at least one cell list. The network may further indicate a cell list of the at least one cell list which is associated with the at least one serving cell. In one example, the at least one serving cell indicated in the cell list is related to (e.g., associated with) a tracking area, a timing advance, a frequency range and/or a UE capability (e.g., a radio frequency (RF) chain).

In one example, the at least one serving cell is determined according to a cell group ID. In one example, the communication device is configured with the at least one serving cell, and the at least one serving cell is associated with (e.g., indicated by) a cell group ID. The network may further configure a cell group ID to the communication device, and the communication device establishes a cell group according to the cell group ID configured by the network. In one example, the communication device is configured with at least one cell group ID to establish at least one cell group. The network may further indicate a cell group ID of the at least one cell group which is associated with the at least one serving cell. In one example, the at least one serving cell indicated by the cell group ID is related to (e.g., associated with) a tracking area, a timing advance, a frequency range and/or a UE capability (e.g., a RF chain).

In one example, the indication is determined according to a BWP ID of one of the plurality of BWPs. The one of the plurality of BWPs is used for transmitting a PDSCH, and the PDSCH is associated with the indication. For example, the communication device determines the TCI state "0" (e.g., the TCI state with the value "0" or TCI=0) according to a lowest BWP ID. For example, the communication device determines the TCI state "1" (e.g., the TCI state with the value "1" or TCI=1) according to a highest BWP ID. In one example, the plurality of BWPs belong to (e.g., are used for) one of the at least one serving cell.

In one example, the indication is determined according to a control resource set (CORESET) ID. In one example, the CORESET ID is a lowest CORESET ID of one of the at least one serving cell in the time interval. In detail, the communication device selects a CORESET with the lowest CORESET ID in the time interval. The indication is used for a control channel QCL indication for the lowest CORESET ID. The communication device uses the QCL assumption associated with the lowest CORESET ID to receive the at least one PDSCH. In one example, the CORESET ID is a CORESET ID (e.g., a lowest CORESET ID) of one of the at least one serving cell in a previous time interval. In detail, the indication is determined according to the CORESET ID in the previous time interval, e.g., if no CORESET ID (or no CORESET) is configured in the time interval. The previous time interval may be a latest time interval before the time interval. That is, the communication device selects a CORESET from at least one CORESET closest to the plurality of PDSCHs in a time domain. The indication is used for a control channel QCL indication for the CORESET ID of the closest CORESET. The communication device uses the QCL assumption associated with the CORESET ID to receive the at least one PDSCH.

Figure 5:
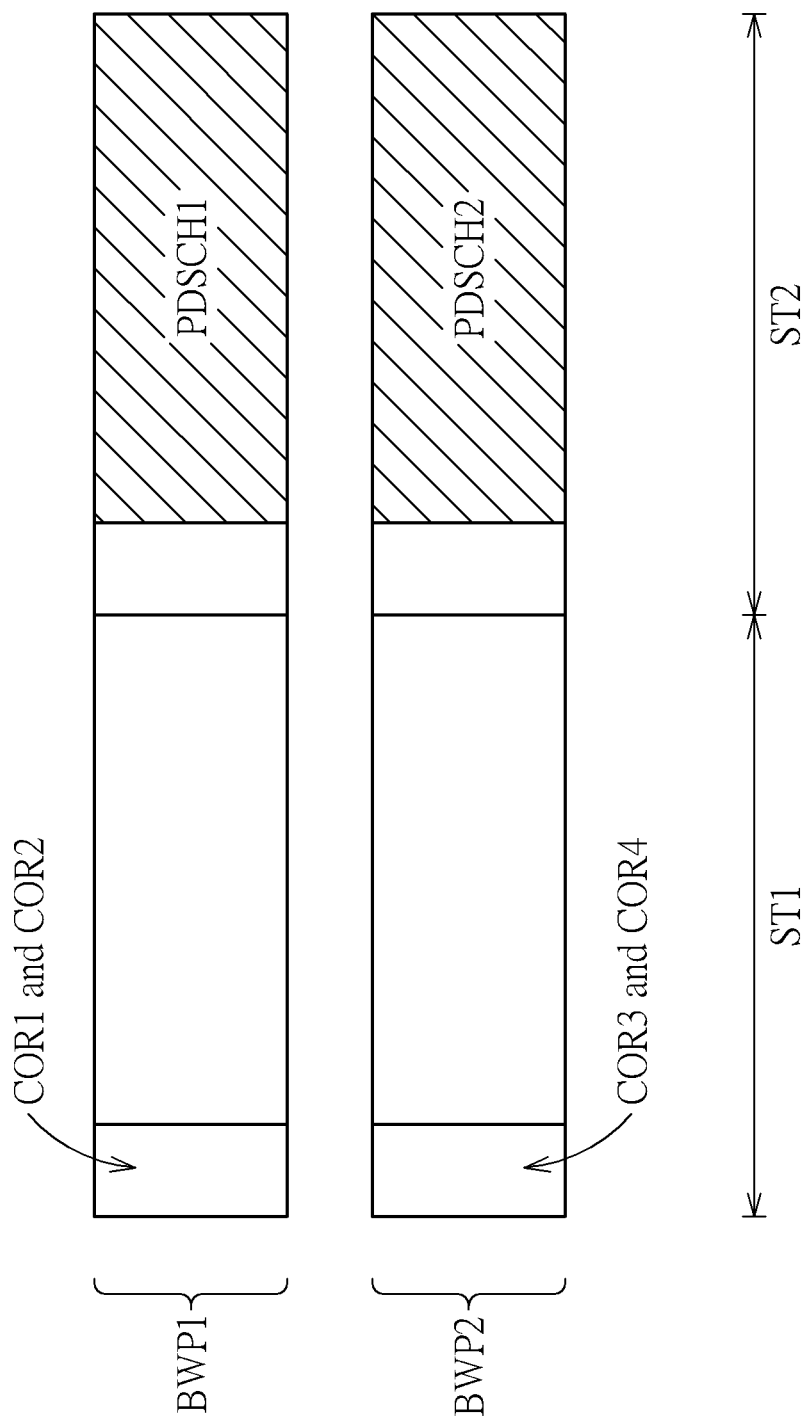
FIG. 5 is a schematic diagram of a reception of a plurality of PDSCHs according to an example of the present invention.

FIG. 5 is a schematic diagram of a reception of a plurality of PDSCHs according to an example of the present invention. The communication device may be scheduled to receive PDSCHs PDSCH1 and PDSCH2 in a slot ST2 from the network. Communications between the network and the communication device are performed via BWPs BWP1 and BWP2. CORSETs COR1 and COR2 are configured in a slot ST1 via the BWP BWP1, and CORSETs COR3 and COR4 are configured in the slot ST1 via the BWP BWP2. In the present example, the communication device selects the CORESET COR1 to determine a TCI state and a QCL assumption, and receives the PDSCHs PDSCH1 and PDSCH2 according to the QCL assumption.

In one example, the indication is determined according to a plurality of subcarrier spacings (SCSs) of the plurality of BWPs. One of the plurality of BWPs with a greater SCS has a higher priority. For example, communications between the network and the communication device are performed via a first BWP and a second BWP. A SCS of the first BWP is 15 kHz, and a SCS of the second BWP is 30 kHz. Thus, the second BWP has a higher priority than the first BWP.

In one example, the indication is determined according to at least one of an indication (e.g., an information element (IE)) in a BWP configuration, an indicator in a DCI command, a BWP ID or a value of a Hybrid Automatic Repeat Request-Acknowledgement (HARQ-ACK) feedback timing. In one example, the BWP configuration includes a list indicating a priority ordering for the plurality of BWPs. In one example, the indicator in the DCI command indicates a priority ordering for the plurality of BWPs. That is, priorities of the plurality of BWPs are determined according to information received from the network. In one example, one of the plurality of BWPs with a higher BWP ID has a higher priority. In one example, one of the plurality of BWPs with a lower BWP ID has a higher priority. That is, the priorities of the plurality of BWPs are determined according to a plurality of BWP IDs of the plurality of BWPs.

In one example, one of the plurality of PDSCHs with a shorter HARQ-ACK feedback timing has a higher priority. That is, the priorities of the plurality of PDSCHs are determined according to the value of the HARQ-ACKs. In one example, one of the plurality of PDSCHs with an earlier time to feed back the HARQ-ACK has a higher priority. That is, the priorities of the plurality of PDSCHs are determined according to the time to feed back the HARQ-ACKs. In one example, a DCI which schedules one of the plurality of PDSCHs indicates a priority of the one of the plurality of PDSCHs.

Figure 6:
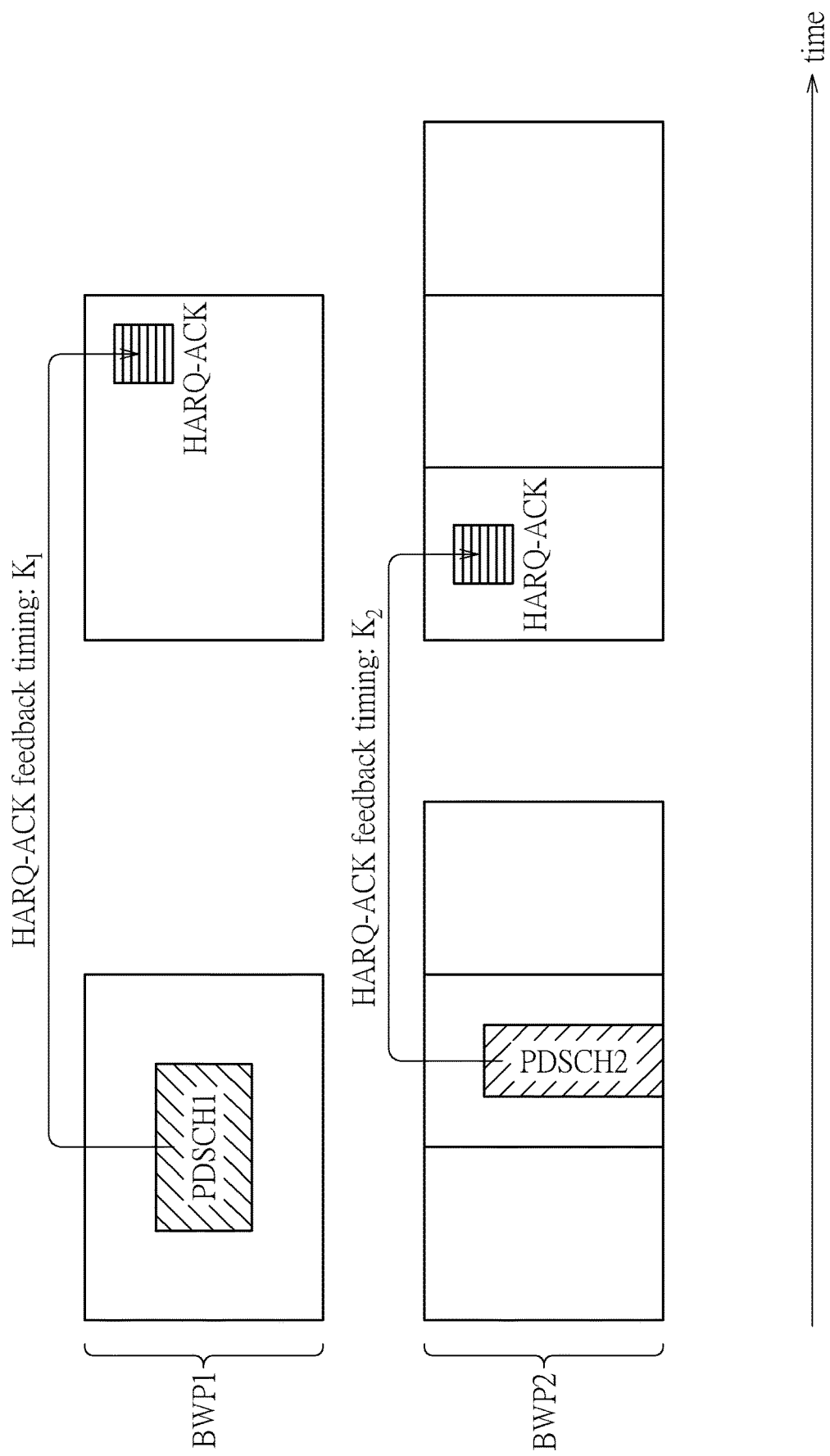
FIG. 6 is a schematic diagram of a processing priority handling according to an example of the present invention.

FIG. 6 is a schematic diagram of a processing priority handling according to an example of the present invention. The communication device may be scheduled to receive PDSCHs PDSCH1-PDSCH2 from the network. Communications between the network and the communication device are performed via BWPs BWP1 and BWP2. The PDSCH PDSCH1 is configured in the BWP BWP1, and the PDSCH PDSCH2 is configured in the BWP BWP2. HARQ-ACK feedback timings of the PDSCHs PDSCH1-PDSCH2 are $K_1$ and $K_2$, respectively. The time to feed back a HARQ-ACK of the PDSCH PDSCH2 is earlier than the other. Thus, the PDSCH PDSCH2 has a highest priority.

Figure 7:
FIG. 7 is a table of a BWP configuration according to an example of the present invention.

FIG. 7 is a table 70 of a BWP configuration according to an example of the present invention. The table 70 includes a list indicating priority orderings for BWPs BWP1-BWP4. The BWPs BWP1-BWP4 are used for communications between the network and the communication device. The list with a value "00" indicates that a priority ordering is the BWPs BWP1, BWP2, BWP3 and BWP4. The list with a value "01" indicates that a priority ordering is the BWPs BWP4, BWP3, BWP2 and BWP1. The list with a value "10" indicates that a priority ordering is the BWPs BWP3, BWP1, BWP4 and BWP2. The list with a value "11" indicates that a priority ordering is the BWPs BWP1, BWP4, BWP3 and BWP2. In one example, the network transmits the BWP configuration including the table 70 and a DCI command including a priority ordering indicator, e.g., the list "10", to the communication device. Thus, the communication device knows that the priority ordering is the BWPs BWP3, BWP1, BWP4 and BWP2.

Figure 8:
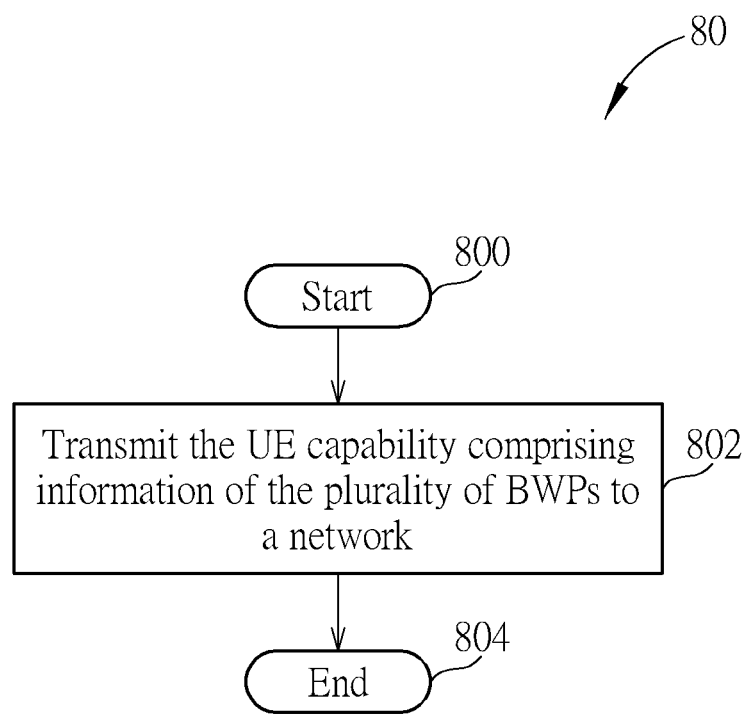
FIG. 8 is a flowchart of a process according to an example of the present invention.

FIG. 8 is a flowchart of a process 80 according to an example of the present invention. A process 80 is utilized in a communication device, to handle a UE capability of communications in a plurality of BWPs, and includes the following steps:

Step 800: Start.

Step 802: Transmit the UE capability comprising information of the plurality of BWPs to a network.

Step 804: End.

According to the process 80, the communication device transmits (e.g., reports) the UE capability comprising an information of the plurality of BWPs to a network. In one example, the information indicates whether the communication device supports the communications in the plurality of BWPs. The plurality of BWPs belong to (are used for) a serving cell. In one example, the information indicates whether the communication device supports a parallel processing of the plurality of PDSCHs in the plurality of BWPs. That is, the communication device informs the network of an ability of the communication device, to perform communications between the network and the communication device regularly.

Realization of the process 80 is not limited to the above description. The following examples may be applied for realizing the process 80.

In one example, the UE capability includes a type indicating a number of at least one numerology of the plurality of BWPs. Furthermore, the type indicates a SCS combination set for at least one frequency range (or for a band of the at least one frequency range). The SCS combination set is at least one SCS supported simultaneously in the at least one frequency range.

FIG. 9 is a table 90 of a UE capability according to an example of the present invention. In the table 90, an indicator field with different values represents different capabilities of the communication device. The indicator field with a value "0" explicitly indicates that the communication device does not support a parallel processing of PDSCH(s) in multiple BWPs, and implicitly indicates that the communication device supports the multiple BWPs, e.g., in a serving cell. That is, the communication device has a limited capability. The indicator field with a value "1" explicitly indicates that the communication device supports the parallel processing of the PDSCH(s) in the multiple BWPs, and implicitly indicates that the communication device supports the multiple BWPs. The indicator field with a value "2" explicitly indicates that the communication device do not support the multiple BWPs, and implicitly indicates that the communication device do not support the parallel processing of the PDSCH(s) in the multiple BWPs. In one example, when the communication device transmits the indicator field with the value "2" to the network, the network comprehends that the communication device does not support the multiple BWPs and the parallel processing of the PDSCH(s).

FIG. 10 is a table 100 of a UE capability according to an example of the present invention. The table 100 illustrates SCS combination sets (or numerologies), e.g., for a first frequency range smaller than 6 GHz and a second frequency range greater than 6 GHz. A type "1" indicates that the SCS combination set is 15 kHz and 30 kHz. A type "2" indicates that the SCS combination set is 15 kHz and 60 kHz. A type "3" indicates that the SCS combination set is 30 kHz and 60 kHz. A type "4" indicates that the SCS combination set is 15 kHz, 30 kHz and 60 kHz. A type "5" indicates a single numerology. In one example, the communication device transmits the type "1" to the network, which represents that the supported SCSs are 15 kHz and 30 kHz. The table 10 illustrates the SCS combination sets of the UE capability, but is not limited herein.

The operation of "determine" described above may be replaced by the operation of "compute", "calculate", "obtain", "generate", "output, "select", "use", "choose/select" or "decide". The term of "according to" described above may be replaced by "in response to". The phrase of "associated with" described above may be replaced by "of" or "corresponding to". The term of "via" described above may be replaced by "on", "in" or "at". The term "at least one of . . . or . . . " described above may be replaced by "at least one of . . . or at least one of . . . " or "at least one selected from the group of . . . and . . . ".

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage device) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a device and method for handling a plurality of PDSCHs in a plurality of BWPs. A communication device determines a QCL assumption according to an indication. Thus, the plurality of PDSCHs are received in the plurality of BWPs according to the QCL assumption. As a result, the problem regarding the plurality of PDSCHs in the plurality of BWPs is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a plurality of Physical Downlink Shared Channels (PDSCHs) in a plurality of bandwidth parts (BWPs), comprising:
at least one storage device; and
at least one processing circuit, coupled to the at least one storage device, wherein the at least one storage device stores instructions, and the at least one processing circuit is configured to execute the instructions of:
determining a quasi-colocation (QCL) assumption according to an indication; and
receiving at least one PDSCH of a plurality of PDSCHs in each of a plurality of BWPs in a time interval according to the QCL assumption from a network, wherein the plurality of PDSCHs are in a plurality of BWPs,
wherein the indication is determined according to a first downlink (DL) control information (DCI) which schedules one of the plurality of PDSCHs,
wherein the first DCI indicates a priority of the one of the plurality of PDSCHs,
wherein each of the plurality of BWPs comprising a subcarrier spacing (SCS).

2. The communication device of claim 1, wherein at least two of the plurality of PDSCHs are associated with a plurality of indications.

3. The communication device of claim 1, wherein the indication is determined according to a latest DCI which schedules one of the plurality of PDSCHs.

4. The communication device of claim 1, wherein the communication device receives the at least one PDSCH from at least one serving cell of the network.

5. The communication device of claim 4, wherein the indication is determined according to a cell identity (ID) of one of the at least one serving cell.

6. The communication device of claim 5, wherein the cell ID is a lowest cell ID.

7. The communication device of claim 4, wherein the at least one serving cell is determined according to a cell list or a cell group ID configured by the network.

8. The communication device of claim 1, wherein the indication is determined according to a BWP ID of one of the plurality of BWPs.

9. The communication device of claim 8, wherein the plurality of BWPs belong to one of at least one serving cell.

10. The communication device of claim 1, wherein the indication is determined according to a control resource set (CORESET) ID.

11. The communication device of claim 10, wherein the CORESET ID is a lowest CORESET ID of one of at least one serving cell in the time interval.

12. The communication device of claim 10, wherein the CORESET ID is a CORESET ID of one of at least one serving cell in a previous time interval.

13. The communication device of claim 1, wherein the indication is determined according to a plurality of subcarrier spacings of the plurality of BWPs.

14. The communication device of claim 1, wherein the indication is determined according to at least one of an indication in a BWP configuration, an indicator in a DCI command, a BWP ID or a value of a Hybrid Automatic Repeat Request-Acknowledgement (HARQ-ACK) feedback timing.

15. A communication device for handling a plurality of Physical Downlink Shared Channels (PDSCHs) in a plurality of bandwidth parts (BWPs), comprising:
- at least one storage device; and
- at least one processing circuit, coupled to the at least one storage device, wherein the at least one storage device stores instructions, and the at least one processing circuit is configured to execute the instructions of:
- determining a quasi-colocation (QCL) assumption according to an indication; and
- receiving at least one PDSCH of a plurality of PDSCHs in each of a plurality of BWPs in a time interval according to the QCL assumption from a network, wherein the plurality of PDSCHs are in a plurality of BWPs,
- wherein the plurality of BWPs and the plurality of PDSCHs have one-to-one correspondence,
- wherein at least two of the plurality of PDSCHs are associated with a plurality of indications,
- wherein the plurality of indications comprising at least one TCI state which indicates that the at least one PDSCH is received according to a different QCL assumption.

* * * * *